United States Patent [19]

Ueotani et al.

[11] Patent Number: 5,411,567
[45] Date of Patent: May 2, 1995

[54] FERMENTATION PRODUCT INDUCED FROM POULTRY MANURE

[75] Inventors: Toshihiro Ueotani, Nara; Yuichi Sugiyama, Hiratsuka, both of Japan

[73] Assignee: The Yokohama Rubber Company, Japan

[21] Appl. No.: 96,851

[22] Filed: Jul. 22, 1993

Related U.S. Application Data

[63] Continuation of Ser. No. 779,854, Oct. 21, 1991, abandoned.

[30] Foreign Application Priority Data

Oct. 23, 1990 [JP] Japan .................................. 2-285215

[51] Int. Cl.$^6$ ................................................ C05F 3/00
[52] U.S. Cl. .......................................... 71/9; 71/21; 435/101
[58] Field of Search .................... 71/9, 21, 11-13; 423/335; 435/101

[56] References Cited

U.S. PATENT DOCUMENTS 4,589,903  5/1986  Sato et al. .................................. 71/9
5,026,641  6/1991  Ishizaki ................................ 435/101

FOREIGN PATENT DOCUMENTS 55-3006  1/1980  Japan .

*Primary Examiner*—Ferris Lander
*Attorney, Agent, or Firm*—Finnegan, Henderson, Farabow, Garrett & Dunner

[57] ABSTRACT

Fermentation products are composed essentially of poultry manure components, which products are derived from reacting poultry manure materials with concentrated sulfuric acid and calcium silicate and subsequently from fermenting the resulting reaction mixture by the use of a selected class of bacteria. The product is suitable for use as an organic fertilizer and as a soil conditioner.

11 Claims, No Drawings

FERMENTATION PRODUCT INDUCED FROM POULTRY MANURE

This application is a continuation of application Ser. No. 07/779,854, filed Oct. 21, 1991, now abandoned.

BACKGROUND OF THE INVENTION

1. Technical Field

This invention relates to products resulting from fermentation of poultry manure and having practical utility as organic fertilizers and soil conditioners. Further, the invention relates to a process for producing such a fermentation product.

2. Prior Art

As a result of a recent expansion of the poultry industry, great concern has been directed toward a quantitative increase in manure or dung. This poultry manure exhales malodor and tends to cause environmental pollution. The offensive odor peculiar to the manure is known to be attributable to organic matter present in the feed wasted as indigested from hens and chicks.

Attempts have been made to deodorize poultry manure as disclosed for instance in Japanese Patent Publication No. 55-3006. This prior method involves treating a poultry manure material with synthetic wollantonite and concentrated sulfuric acid and drying the thus treated manure in a speedy manner. Though acceptable in the efficiency of deodorization, such method fails to fully decompose the feed remaining as indigestive in the manure. This means that the manure thus treated will be made inadequate or ineffective for purposes of fertilization.

In addition to the above problem in poultry farming, a similar problem has been aroused by the disposal of serums in the territories where natural rubber is produced. Such a serum is byproduced upon coagulation and removal of rubber components from a natural rubber latex. Contained in the byproduct are non-rubber components such as proteins, saccharides and the like. The serum is rather decomposable and unpleasantly odorous due to those non-rubber components and hence environmentally pollutional.

SUMMARY OF THE INVENTION

It has now been found that the components of poultry manure materials and natural rubber serums when decomposed and fermented can be utilized for agricultural application with their respective malodors removed.

The invention therefore seeks to provide new fermentation products originating from poultry manure materials and if necessary in combination with natural rubber serums, which products are substantially odorless and highly capable of organic fertilization and soil conditioning. The invention also seeks to provide a process for producing such a fermentation product.

The fermentation product according to the invention contributes greatly to growth of benignant soil bacteria and moreover improves or otherwise enriches those soils having become impoverished owing to repeated use of complex fertilizers.

Many other objects and advantages of the invention will be better understood from the following description.

PREFERRED EMBODIMENTS OF THE INVENTION

According to a first embodiment of the invention, there is provided a fermentation product composed essentially of poultry manure components. The product results from reacting a poultry manure material with concentrated sulfuric acid and calcium silicate and subsequently from fermenting the reaction mixture in the presence of a bacterium.

A modified fermentation product of the first embodiment is also provided which is made up of poultry manure components and natural rubber serum components. The modified product is derivable by reacting a poultry manure material with concentrated sulfuric acid and calcium silicate and subsequently by fermenting the reaction mixture in the presence of a serum and a bacterium.

The invention in a second embodiment contemplates the provision of a process for the production of a fermentation product containing poultry manure components. The process comprises the steps of (a) admixing a poultry manure material with concentrated sulfuric acid and calcium silicate in a vessel and then reacting the mixture, and (b) thereafter fermenting the reaction mixture of step (a) in the presence of a bacterium.

Poultry manure materials eligible for the invention are such available usually from poultry houses. Concentrated sulfuric acid is used to decompose the manure, and though not restricted, it is preferred to be of a 98% grade. Calcium silicate acts to neutralize the decomposed manure and to form a water-soluble silicate gel for good absorption by plants. Calcium silicate compounds used herein are preferably of a configuration in which calcium oxide and silicon dioxide are chemically bonded.

The poultry manure, once reacted with concentrated sulfuric acid and calcium silicate, is bacterially fermented so that it is rendered substantially deodorant. Suitable bacteria include mold bacteria such as Saccharomyces, Pseudomonas and the like and yeasts, all of an aerobic class, and actinomycetic bacteria such as Actinomadura, Actinoplanes, Micromonospora and the like and nitrifying bacteria such as a nitrate bacterium, a nitrous bacterium and the like.

Serums according to the invention are those obtained after the removal of rubber components from natural rubber latices tapped out of rubber trees as described hereinbefore.

To implement the process of the invention, a poultry manure material is put into a vessel and then hydrolyzed with addition of concentrated sulfuric acid, followed by neutralization of the manure with calcium silicate and by formation of a water-soluble silicate gel. While the acid and silicate may be added simultaneously, it is preferred to bring the acid into initial contact with the manure in order to facilitate decomposition.

The concentrated sulfuric acid preferably ranges in amount from 7 to 20 parts by weight per 100 parts by weight of the poultry manure as a solids content of 100%. The calcium silicate is added in an amount of 8 to 24 parts by weight per 100 parts by weight of a similar manure.

The fermentation step according to the invention may be carried out at one or more stages. In the case of a one-step fermentation, any one bacterium is chosen from the aerobic bacteria specified above. A two-stage fermentation involves a primary fermentation using a given aerobic bacterium and a secondary fermentation using a given actinomycetic or nitrifying bacterium.

A modified form of the second-embodied process is designed to produce a fermentation product composed of poultry manure components and natural rubber serum components. The modified process comprises the steps of (a) admixing a poultry manure material with concentrated sulfuric acid and calcium silicate in a vessel and then reacting the mixture, (b) incorporating in the reaction mixture of step (a) a serum which results from the removal of rubber components by coagulation from a natural rubber latex and contains non-rubber components, and (c) thereafter fermenting the whole mixture of step (b) in the presence of a bacterium. All the details of the second-embodied process are applied as such to the modified process except for certain changes made.

In the practice of the modified process, the serum may be put into the vessel prior to charge of the manure, or may be added at the time the fermentation step is initiated. The amount of the serum used is set at from 13 to 40 parts by weight, based on a solids content of 70%, per 100 parts by weight of the manure material as a solids content of 100%. The serum when used in liquid form at a fermentation stage may conveniently be sprayed on to the poultry manure decomposed. The invention will now be described by way of the following examples which are given for purposes of illustration only.

EXAMPLE 1

A reactor of 4 m$^3$ in volume equipped with a stirrer and an exhaust gas treating device was charged with 200 kg of poultry manure of 60% in solids content and then with 11 kg of sulfuric acid of 98% in concentration while in stirring of the manure. Into the mixture was incorporated with stirring 20 kg of calcium silicate (Esment, Onoda Cement Co., hydraulically comminuted a blast furnace slag), after which stirring was continued for about 15 minutes. The reaction system was exothermic with a temperature rise up to about 150° C. Care was taken in preventing air pollution with any offensive or reaction gas made fully combustible by means of a combustion-deodorization device of a directly flammable, regenerative type (Hamada Seisakusho Co.).

After being let to stand in a first fermentor, the above reaction mixture was subjected to a primary fermentation by the action of a given mold or yeast bacterium of an aerobic class specified above and cultured previously. This fermentator was of an aerobic type having a top portion left open and a bottom disposed to convey an air stream via conduits toward the open portion. After lapse of approximately 70 hours, the system was elevated, owing to the heat of fermentation reaction, in its temperature at about 70° C. The product having been fermented was transferred from the first fermentor into adjacent auxiliary fermentors every about 90 hours because anaerobic fermentation took place at a region in proximity to an inner wall of each of the fermentors, thus leading to variable or irregular quality.

The above reaction system became stable at about 40° C. upon lapse of 500 to 600 hours after charging in the first fermentor. The resulting product was put into a second fermentor opened at its top portion. With the first-fermented product piled up at either one side of the second fermentor, a secondary fermentation was aerobically performed with stirring once or more a day for consecutive 30 days. About 15 days afterwards, the temperature in the system was held constant with heat buildup ceased, after which a given actinomycetic or nitrifying bacterium previously cultured was incorporated with gentle stirring. The system was further stirred gently to thereby attain uniform dispersion of the bacterium.

The fermentation product according to the invention was brown, odorless, crumbly and substantially neutral at a pH of 7.2 as an aqueous solution of 1% in concentration.

The composition of thi, s product is shown in Table 1 as determined by the Fertilizers Inspection Institute of Japan.

Bacteria of an actinomycetic or nitrifying class for use in the secondary fermentation render arable those soils having got exhausted from succession cropping. They also prevent crops from damage by noxious insects in solids.

EXAMPLE 2

The procedure of Example 1 was followed except that 20 kg of a semisolid serum concentrated to a solids content of 70% was added prior to admixture of calcium silicate and that a Saccharomyces or Pseudomonas bacterium was used for the primary fermentation in fermenting the resultant reaction mixture and also in decomposing the serum components such as proteins, saccharides and the like.

The desired product of fermentation was derived to be brown and crumbly and more deodorous or rather more fragrant than the product of Example 1.

The product composition is listed in Table 2 as assayed by the above authorized organization.

EXAMPLE 3

The procedure of Example 1 was followed except that when the reaction mixture was raised at 70° C. in the first fermentor, 70 kg of a liquid serum of about 20% in solids content was sprayed uniformly over the reaction mixture.

The final fermentation product was brown, deodorous and particulate.

EXAMPLE 4

To evaluate fertility performance, the products obtained in Examples 1 and 3 were employed to grow a brassicaceous green, a kind of Chinese cabbages. Cropping was carried out in Nara Prefecture in a western district of Japan and under the conditions indicated below.

The product of Example 1 was hereunder referred to as "sample A" for brevity and the product of Example 3 as "sample B". Samples A and B each were put in varying amounts of 5, 10, 20 and 40 g, respectively, into a pot of 500 g of an air-dried paddy soil. Each pot was adjusted in its water content to 60% and sowed with 25 seeds of the grass tested. Sowing was done on November 11 and harvesting on January 11.

To facilitate comparison, there were provided six different sections of cropping, details of which are given below.
  section I: sample A alone
  section II: sample B alone
  section III: chemical fertilizer alone
  section IV: sample A plus chemical fertilizer
  section V: sample B plus chemical fertilizer
  section VI: poultry manure plus chemical fertilizer Section III was fertilized per pot with 50 mg of calcium perphosphate as $P_2O_5$, 50 mg of potassium sulfate as $K_2O$ and ammonium nitrate as N in varied amounts of 0, 25, 50, 75 and 100 mg. The chemical fertilizer used in each of sections IV, V and VI was composed per pot of 50 mg of ammonium nitrate as N, 50 mg of calcium perphosphate as $P_2O_5$ and 50 mg of potassium sulfate as $K_2O$.

The test results are listed in Table 3 from which sections I, II, IV and V have been found to be conspicuously superior in crop height and crop weight to sections III and VI. In direct comparison of the same qualities between sections I and II, sample B is more effective than sample A particularly in the case of use of a smaller proportion, say 5 g. This means that the serum contributes to improved fertility.

EXAMPLE 5

Sample A was applied in growing a lawngrass, pencrosvent grass or *Agrostis palustris*. Evaluation was made by Kansai Green Institute, Japan.

On and over three sections of lawngreen administered in the form of golf course greens was sprayed sample A in varied quantities, followed by inspection of green darkness of the lawngrass. A commercially available chemical fertilizer of an organic class was tested for comparison.

The results obtained are shown in Table 3 in which greeness is rated by the color coefficient or CC on a 10-day passage after treatment. Inventive sections 1 to 3 are highly green as against control section 7 and substantially comparable to comparative sections 4 to 6. Continued inspection has demonstrated that sections 1 to 6 reach a maximum level of greeness at or about 14th day after treatment, with subsequently gradual reduction in potency.

TABLE 1

| | |
|---|---|
| water ($H_2O$) | 17.54% |
| total nitrogen (N) | 2.52% |
| ammonaceous nitrogen (N) | 1.17% |
| total phosphoric acid ($P_2O_5$) | 3.73% |
| soluble phosphoric acid ($P_2O_5$) | 3.14% |
| water-soluble phosphoric acid ($P_2O_5$) | 0.21% |
| total potassium ($K_2O$) | 1.88% |
| water-soluble potassium ($K_2O$) | 1.86% |
| total silicic acid ($SiO_2$) | 8.52% |
| total calcium oxide (CaO) | 15.87% |
| total magnesium oxide (MgO) | 1.64% |
| water-soluble magnesium oxide (MgO) | 1.16% |
| total manganese (MnO) | 0.07% |
| chlorine (Cl) | 0.55% |
| pH, 5 g/500 ml, 22° C. | 7.2 |

TABLE 2

| | |
|---|---|
| water ($H_2O$) | 26.68% |
| total nitrogen (N) | 2.43% |
| ammonaceous nitrogen (N) | 1.38% |
| total phosphoric acid ($P_2O_5$) | 3.33% |
| soluble phosphoric acid ($P_2O_5$) | 3.03% |
| water-soluble phosphoric acid ($P_2O_5$) | 0.30% |
| total potassium ($K_2O$) | 1.98% |
| water-soluble potassium ($K_2O$) | 1.96% |
| total silicic acid ($SiO_2$) | 5.38% |
| total calcium oxide (CaO) | 12.59% |
| total magnesium oxide (MgO) | 1.73% |
| water-soluble magnesium oxide (MgO) | 1.43% |
| total manganese (MnO) | 0.06% |
| chlorine (Cl) | 0.44% |
| pH, 5 g/500 ml, 22° C. | 7.2 |

TABLE 3

| section | | fertilizer/amount | | | crop height (cm) | crop weight (g/10 crops) |
|---|---|---|---|---|---|---|
| | | ammonium sulfate (mg as N) | calcium perphosphate (mg as $P_2O_5$) | potassium sulfate (mg as $K_2O$) | | |
| III | 1 | 0 | 50 | 50 | 5 | 3 |
| | 2 | 25 | 50 | 50 | 9 | 8 |
| | 3 | 50 | 50 | 50 | 11 | 12 |
| | 4 | 75 | 50 | 50 | 12 | 17 |
| | 5 | 100 | 50 | 50 | 14 | 18 |
| | | sample A (g) | | | | |
| I | 6 | 5 | | | 9 | 10 |
| | 7 | 10 | | | 10 | 11 |
| | 8 | 20 | | | 13 | 20 |
| | 9 | 40 | | | 18 | 38 |
| | | sample A (g) | chemical fertilizer | | | |
| IV | 10 | 5 | same as III-3 | | 14 | 20 |
| | 11 | 10 | same as III-3 | | 15 | 23 |
| | 12 | 20 | same as III-3 | | 16 | 29 |
| | 13 | 40 | same as III-3 | | 19 | 38 |
| | | sample B (g) | | | | |
| II | 14 | 5 | | | 14 | 21 |
| | 15 | 10 | | | 16 | 24 |
| | 16 | 20 | | | 18 | 28 |
| | 17 | 40 | | | 20 | 39 |
| | | sample B (g) | chemical fertilizer | | | |
| V | 18 | 5 | same as III-3 | | 15 | 24 |
| | 19 | 10 | same as III-3 | | 16 | 29 |
| | 20 | 20 | same as III-3 | | 19 | 38 |
| | 21 | 40 | same as III-3 | | 21 | 43 |
| | | poultry manure (g) | chemical fertilizer | | | |
| VI | 22 | 5 | same as III-3 | | 10 | 10 |
| | 23 | 10 | same as III-3 | | 10 | 11 |
| | 24 | 20 | same as III-3 | | 13 | 21 |
| | 25 | 40 | same as III-3 | | 16 | 34 |

TABLE 4

| section | | amount (g/m²) | color temp (K°) | CC |
|---|---|---|---|---|
| invention | 1 | 50 | 3900 | +15 |
| | 2 | 100 | 3960 | +16 |
| | 3 | 200 | 4050 | +16 |
| comparison | 4 | 10 | 3900 | +14 |
| | 5 | 30 | 3920 | +16 |
| | 6 | 50 | 3960 | +15 |
| control | 7 | — | 3750 | +13 |

What is claimed is:

1. A fermentation product derived from poultry manure and useful aS an organic fertilizer, which product results from reacting a poultry manure material with concentrated sulfuric acid and calcium silicate and subsequently fermenting the reaction mixture in the presence of (i) a serum produced by the removal of rubber components by coagulation from a natural rubber latex and containinq non-rubber components and (ii) a bacterium, wherein the fermentation step comprises conducting a primary fermentation of said reaction mixture using an aerobic bacterium followed by a secondary aerobic fermentation of the product of said primary fermentation using an actinomycetic or nitrifying bacterium.

2. The product according to claim 1, where the bacterium used in said primary fermentation is a bacterium selected from the group consisting of Saccharomyces, Pseudomonas and yeasts, and the bacterium used in said secondary fermentation is a bacterium selected from the groupsconsisting of Actinomadura, Actinoplanes, Micromonospora and a nitrate or nitrous bacterium.

3. A process for the production of a fermentation product derived from poultry manure, which process comprises the steps of (a) admixing a poultry manure material with concentrated sulfuric acid and a calcium silicate in a vessel and then reacting the mixture, (b) fermenting the resultant reaction mixture in a primary fermentation step in the presence of (i) a serum produced by the removal of rubber components by coagulation from a natural rubber latex and containinq non-rubber components and (ii) an aerobic bacterium, and (c) subsequently aerobically fermenting the resultant fermentation product of the primary fermentation step in a secondary fermentation step in the presence of an actinomycetic or nitrifying bacterium.

4. The process according to claim 3, wherein said aerobic bacterium used in said primary fermentation is selected from the group consisting of Saccharomyces, Pseudomonas and yeasts, and said bacterium used in said secondary fermentation is selected from the group consisting of Actinomadura, Actinoplanes, Micromonospora and nitrate or nitrous bacterium.

5. The process according to claim 3, wherein the poultry manure material is admixed first with the concentrated sulfuric acid and then with the calcium silicate.

6. The process according to claim 3, wherein the concentrated sulfuric acid is added in an amount of 7 to 20 parts by weight per 100 parts by weight of the poultry manure material at a solids content of 100%.

7. The process according to claim 3, wherein the calcium silicate is added in an amount of 8 to 24 parts by weight per 100 parts by weight of the poultry manure material at a solids content of 100%.

8. The process according to claim 3, wherein the serum is added in amount of 13 to 40 parts by weight, based on a solids content of 70%, per 100 parts by weight of the poultry manure material at a solids content of 100%.

9. The process according to claim 3, wherein the serum is put into the vessel prior to charging the poultry manure material thereto.

10. The process according to claim 3, wherein the serum is substantially semi-solid or liquid.

11. The process according to claim 3, wherein an actinomycetic or nitrifying bacterium is added in step (c) after said secondary fermentation has begun.

* * * * *

UNITED STATES PATENT AND TRADEMARK OFFICE
CERTIFICATE OF CORRECTION

PATENT NO. : 5,411,567

DATED : May 2, 1995

INVENTOR(S) : Toshihiro Ueotani and Yuichi Sugiyama

It is certified that error appears in the above-indentified patent and that said Letters Patent is hereby corrected as shown below:

Claim 1, column 7, line 12, "aS" should read --as--;
line 19, "containinq" should read --containing--.

Claim 3, column 8, line 1, "containinq" should read --containing--.

Signed and Sealed this

Twenty-first Day of November, 1995

Attest:

BRUCE LEHMAN

Attesting Officer       Commissioner of Patents and Trademarks